United States Patent
Holt et al.

(10) Patent No.: US 6,393,923 B1
(45) Date of Patent: May 28, 2002

(54) DYNAMIC BENDLOSS MEASURING DEVICE

(75) Inventors: James C. Holt, Fayetteville, TN (US);
Kevin W. Johnston, Decatur, AL (US);
C. Wayne Long, Tullahoma, TN (US);
Robert T. Foscue, Huntsville, AL (US);
Roy A. Kesmodel, Ardmore, TN (US);
James W. McKee, Madison, AL (US);
Robert L. Light, Harvest, AL (US);
Judy K. Burden, Huntsville, AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/844,414

(22) Filed: Apr. 30, 2001

(51) Int. Cl.[7] .......................... G01L 1/24; G01N 21/00; G01M 11/00
(52) U.S. Cl. .................. 73/800; 356/73.1; 356/124.5
(58) Field of Search .......................... 73/800; 356/73.1; 385/13, 32, 12; 250/227.16, 227.15, 227.14

(56) References Cited

U.S. PATENT DOCUMENTS 4,468,117 A * 8/1984 Hartouni et al. .......... 356/239.2
4,636,070 A * 1/1987 Ide .............................. 356/73.1
4,659,215 A * 4/1987 Sumida et al. .............. 356/435
4,714,343 A * 12/1987 Ide .............................. 356/73.1
5,410,396 A * 4/1995 Rochester .................... 356/429

FOREIGN PATENT DOCUMENTS

JP 01203938 * 8/1989 .............. 356/124.5

* cited by examiner

Primary Examiner—Benjamin R. Fuller
Assistant Examiner—Lilybett Martir
(74) Attorney, Agent, or Firm—Arthur H. Tischer; Freddie M. Bush; Hay Kyung Chang

(57) ABSTRACT

The Dynamic Bendloss Measuring Device allows easy, repeatable determination of the bend sensitivity of a single-mode optical fiber by subjecting the fiber to dynamically changing bend angles under varying degrees of tension and bend diameters. It utilizes a swing arm capable of sweeping an arc subtending a range of angles at any given bend diameter and fiber tension and calculating the bendloss from the light attenuation at each degree of the range. The varying bend diameters are provided by pins of diverse diameters that are singly inserted into an adjustably-sized aperture while the variation in the applied tension can be effected by changing the input current setting in the tension assembly. With each new pin and tension setting, the swing arm sweeps through the pre-selected range of bend angles, resulting in varying degrees of attenuation of light.

16 Claims, 3 Drawing Sheets

DYNAMIC BENDLOSS MEASURING DEVICE

The invention described herein may be manufactured, used and licensed by or for the Government for governmental purposes without the payment to us of any royalties thereon.

BACKGROUND OF THE INVENTION

During any payout application of optical fibers, substantial signal losses can occur when the length of the fiber is turned about a relatively small diameter of curvature (macrobending) or when very small bends (microbending) are introduced. The severity of these losses depends on the magnitude of the bending introduced, such as the sharpness of the curvature of the macrobend, or the number of microbends along the length of the fiber.

Bendloss is a function of the bend diameter as well as of the wavelength of the light propagating through the fiber. For modem single mode type fibers, low levels of attenuation allow the use of extremely long lengths of optical fiber without intermediate repeaters or amplifiers, provided certain physical constraints are considered.

Bendloss consists of two components: a transition loss and a pure bend loss. The transition loss occurs when a change in curvature of the fiber axis is such that coupling of light changes from the fundamental mode to leaky core mode. The pure bend loss results from the continual loss of guidance at the outer portion of the evanescent field of the fundamental mode. This ejected radiation from the core can set up what is called "whispering gallery" (WG) modes in the cladding in which the leaking light can be re-coupled back into the primary core conducting mode.

Current fiber bendloss test equipment used by fiber manufacturers measures fiber optic attenuation at one constant bend diameter, over one constant bend angle and at one constant tension. To do so, the fiber is simply wrapped a number of times around a mandrel of a specific given diameter under a given tension. Then a comparison is made between the power input to the fiber and the power output from the fiber and the attenuation of the fiber calculated from this comparision data. As is obvious, the bend sensitivity information thus produced is severely limited in its usefulness, being helpful only in applications where the bend radius of the fiber is equal to or greater than that used during the test. More importantly, the use of relatively long lengths of fiber wrapped many times about a mandrel, for all practical purposes, eliminates any effects due to WG modes.

For typical payout fibers of short lengths, bend diameters of less than 3 mm enable conditions that allow WG modes to originate within the cladding. The interference between these WG modes and the core fundamental mode causes oscillatory power loss in the core. To evaluate candidate optical fibers for diverse payout applications, it is greatly desirable to have a means to measure the bendloss characteristics of the optical fibers under realistic conditions involving various degrees of tension applied to the fibers as well as various bend angles and bend diameters. One such realistic application is the use of optical fibers in Fiber Optic Guided Vehicle (FOG-V) dispensers where information concerning the magnitude of optical attenuation during fiber deployment is critical.

SUMMARY OF THE INVENTION

The Dynamic Bendloss Measuring Device (DBMD) allows the determination of the bend sensitivity of a single-mode optical fiber by subjecting it to dynamically changing bend angles at varying degrees of tension and bend diameters. It utilizes a swing arm capable of sweeping an arc subtending angles ranging from 0° to 170° at any given bend diameter and fiber tension and takes the bendloss measurement at each degree of the range. The varying bend diameters are provided by pins of diverse diameters and can be easily effected by substituting one pin for another while the variation in the applied tension can be effected by changing the input current setting in the tension assembly. With each new pin and tension setting, the swing arm sweeps through the pre-selected range of bend angles enabling the calculation of the bendloss at any of the bend angles.

DESCRIPTION OF THE PREFERRED EMBODIMENT

Figure 1:
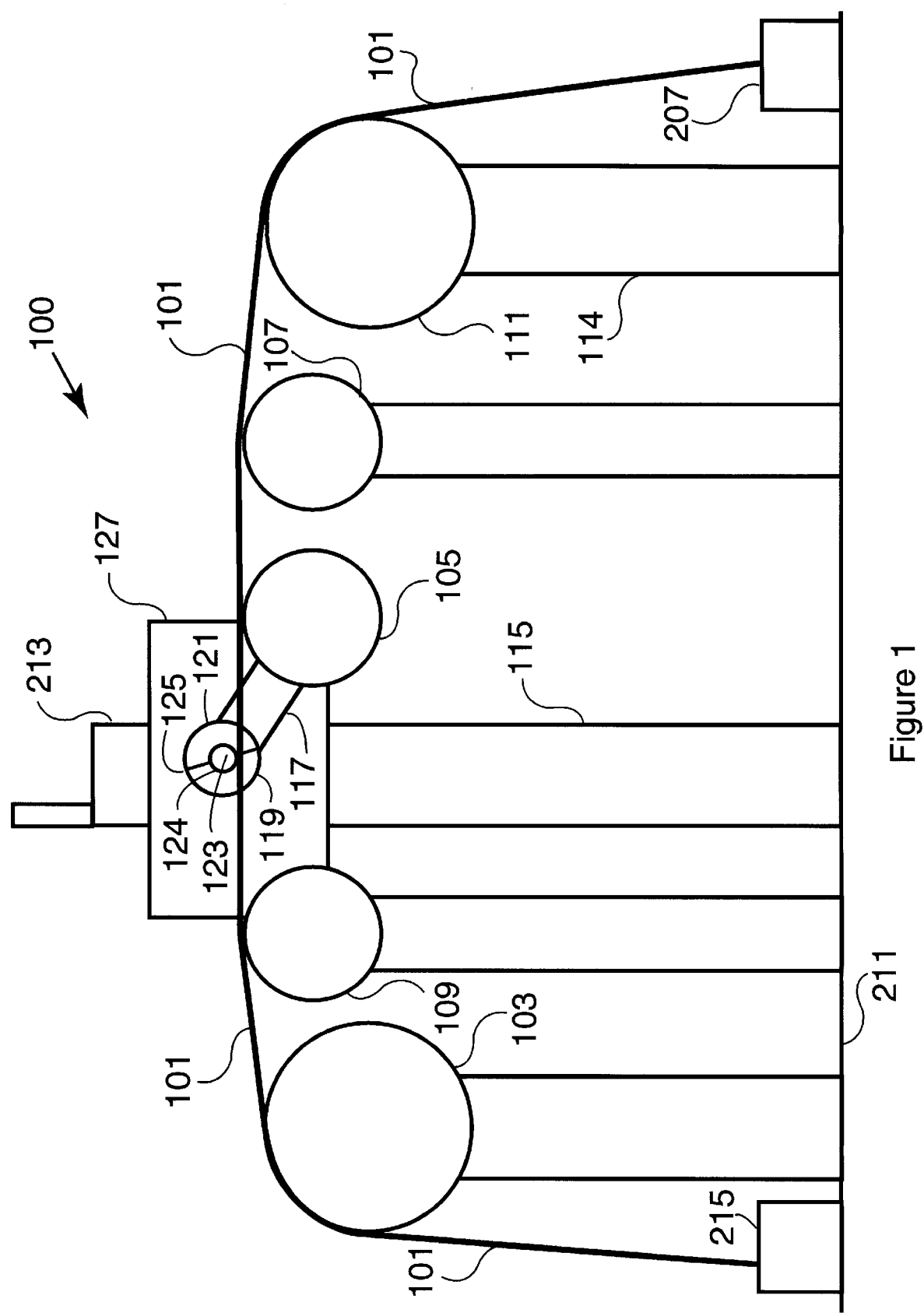
FIG. 1 is a diagram of the frontal view of the Dynamic Bendloss Measuring Device.

For reasons practical to military applications, the Dynamic Bendloss Measuring Device (hereinafter referred to as the DBMD) employs pins of diverse diameters ranging from 2 mm to 10 mm and tension settings from 100 grams to 500 grams in 100-gram increments. But these diameter and tension ranges are representative only and the DBMD can be fabricated to operate with any desired bend diameters and tension settings for other applications.

Referring now to the drawing wherein like numbers represent like parts in each of the several figures, the structure and operation of the DBMD are described in detail.

Fiber optic cable or optical fiber 101, to be tested by DBMD 100, is payed out from supply spool 103 and traverses ultimately to take-up spool 111. Light of about 1550 nm in wavelength and about 1 milliwatt in power is coupled from laser 215 into the fiber at its first end and travels the entire length of the fiber finally to exit at its second end of the fiber and is detected by optical detector 207. (Once again, the wavelength and power of light used here are representative only. Other wavelengths and power settings may be used depending on the characteristics of the optical fiber selected to be tested.) In between the supply and take-up spools, fiber 101 is guided by high friction third pulley 109, which is mounted to be stationary (not adapted to spin). Around this third pulley, the fiber is wrapped once to isolate the portions of the fiber still remaining on the supply spool from the tension that is being applied to the payed-out fiber. In this wrapping, care must be taken to avoid wrapping the fiber over itself; otherwise, microbending may be introduced. The payed-out fiber then traverses on to pin 123 that is nestled inside adjustable aperture 124 except for a nominal portion that protrudes from the aperture. Here, the fiber comes into contact with the bottom surface of the protruding portion of the pin that has a given diameter and proceeds to slide across the top of first pulley 105. The first pulley, unlike the third pulley mentioned above, has low-to-no friction such that it spins freely. From this first pulley, the fiber is further guided by second pulley 107, also of low-to-no friction so as to spin freely like first pulley 105, prior to being collected by take-up spool 111.

Figure 2:
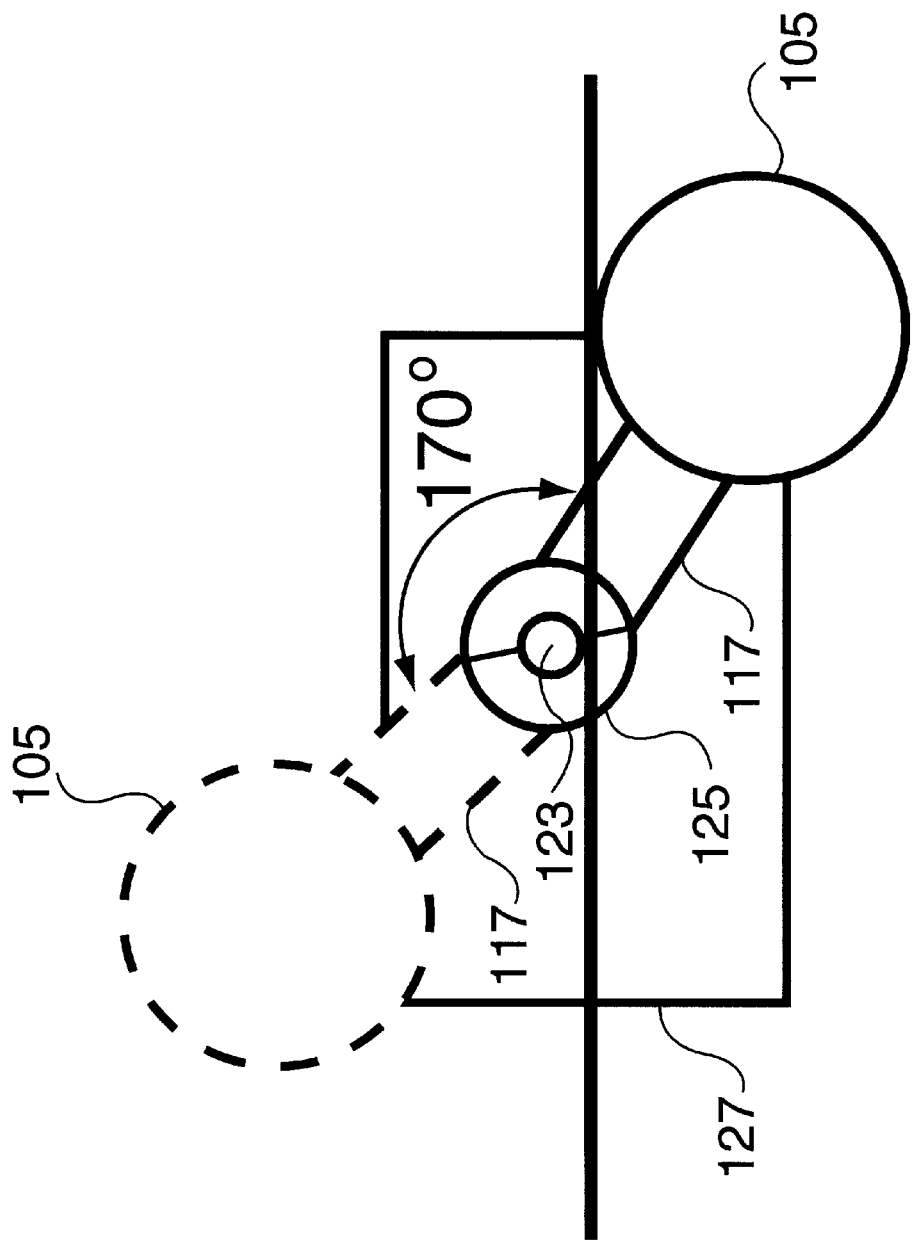
FIG. 2 illustrates the sweep of the swing arm.
Figure 3:
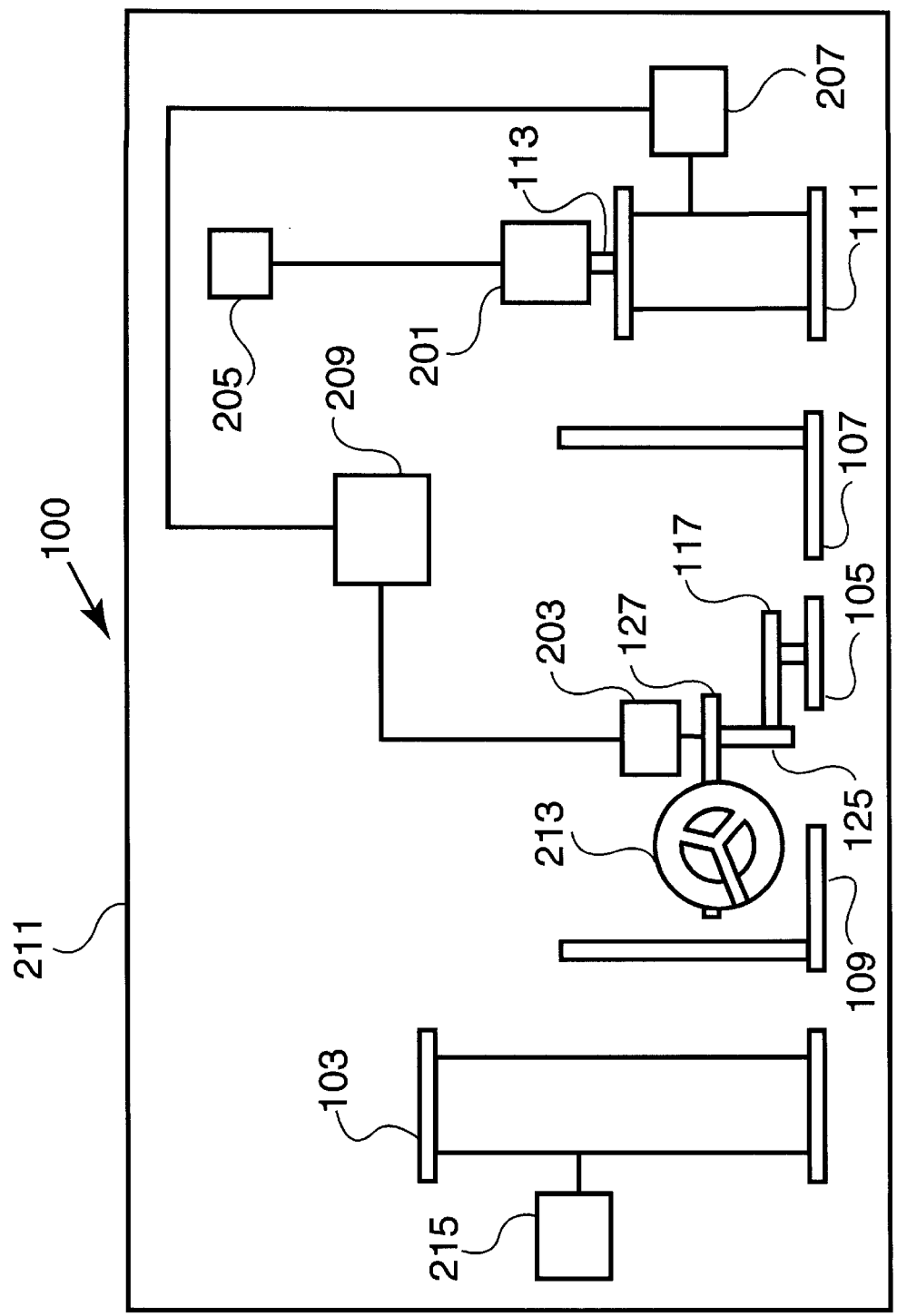
FIG. 3 presents a top view of the Dynamic Bendloss Measuring Device.

The proper positioning of the fiber relative to the pin and the first pulley as described above is critical in performing the bendloss measurement test by subjecting the fiber to various bend angles. The fiber must neither slip off of either the pin or the pulleys during the test nor suffer more than minimal friction from its contact with the first and second pulleys. The various bend angles are imparted to the fiber as swing arm 117, when driven by first motor 203, sweeps through a pre-selected range of bend angles, pivoting around the pin and carrying with it the first pulley attached to the arm as illustrated in FIG. 1 and FIG. 3. This swinging action causes the fiber on the first pulley to undergo, at the point of the pin location, varying degrees of bend angles within the pre-selected range. The sweep of the arm is illustrated in FIG. 2 where it is shown that the arm has a swing range of 170° degrees. This is usually sufficient for many measuring endeavors, even though the arm could be adapted for wider swings.

A pre-selected tension is applied to the payed-out fiber by second motor 205 and clutch 201 as diagrammed in a top view presented in FIG. 3. The second motor, which may be an AC synchronous motor with 15:1 gear head, is connected to clutch 201 which may be of a magnetic particle type and has a suitable power supply and control circuitry. The clutch produces an output torque that is directly proportional to the input current produced by the second motor and input to the clutch. The output torque of the clutch is then coupled to first shaft 113, which, in response, rotates take-up spool 111. The take-up spool is rotated in a direction to collect the fiber until the resulting tension in the fiber imparts a torque to the first shaft that is equal to the clutch torque. At this point, the clutch begins to slip in order to maintain a constant tension in the payed-out fiber as the fiber is subjected to varying bend angles with the sweep of swing arm 117. It is noted that prior to the beginning of any measurement testing, the fiber should be initially wound around the take-up spool enough turns (about 18 turns) to ensure that any unwanted modes, such as secondary, of light are attenuated down the length of the fiber without affecting the optical measurements for single mode.

As illustrated in FIG. 1, aperture 124 is formed by first hemisphere 119 and second hemisphere 121, which together make up knob 125. The knob is mounted on bracket 127 which, in turn, is supported by second shaft 115. Each of the hemispheres has an indentation on the flat side thereof, which are positioned so as jointly to create the aperture when the two flat sides of the hemispheres come together. The size of the aperture is adjustable by controlling the final resting distance between the hemispheres when they come together. The adjustable aperture size enables accommodation in it of a plurality of pins of diverse diameters. These pins are inserted into the aperture, one at a time, to provide varying bend diameters, thus simulating a variety of bend diameters that an optical fiber may be subjected to in actual use. As pins of different diameters are used, it may be necessary to adjust the height of the pin on second shaft 115 so as to enable optical fiber 101 to remain horizontal while touching the bottom surface of the protruding portion of the pin and the top surface of first pulley 105 before the swing arm is activated. This height adjustment is achieved by lowering or raising, as necessary, the bracket on second shaft 115. Turn wheel 213 is used to manipulate the lowering or raising.

As the swing arm makes the sweep, the light exiting from the second end of the fiber is detected by detector 207 at one degree increments and these detected optical signals are converted into corresponding voltage signals and forwarded to computer 209. The computer, as depicted in FIG. 3, is also connected to control first motor 203 that drives the swing arm.

With each chosen bend diameter pin, the swing arm completes a pre-selected number of passes (0° to 170°, 170° to 0°, 0° to 170°, 170° to 0° and so on) while the computer collects the voltage signal data. The voltages at each degree of the completed passes are averaged to yield the useful voltage at that degree of bend angle. The voltage data is then used to compute the optical bendloss suffered by the optical fiber at the given bend diameter, at the given tension at each bend angle within the pre-selected range of bend angles. The bendloss calculation may be displayed on the computer for viewing by the operator of the DBMD.

The bendloss measurement procedure using the same optical fiber may be repeated with a different tension as well as with a different bend diameter. The tension setting is changed by changing the current setting of the second motor, thus ultimately changing the torque supplied to first shaft that is coupled to the take-up spool.

The Dynamic Bendloss Measuring Device provides a means for testing candidate optical fibers for their bend sensitivity while avoiding static fatigue which can develop when the fibers are exposed to high tensions at small bend diameters for a time period long enough to allow the tester manually to record the change in optical attenuation.

Although a particular embodiment and form of this invention has been illustrated, it is apparent that various modifications and embodiments of the invention may be made by those skilled in the art without departing from the scope and spirit of the foregoing disclosure. For example, the DBMD may be supported by single-piece base plate 211 to render the device stability. Accordingly, the scope of the invention should be limited only by the claims appended hereto.

We claim:

1. A dynamic bendloss measuring device for measuring the bend sensitivity of a single mode optical fiber at various bend diameters, said optical fiber having a first end and a second end and said measuring device comprising:

a supply spool of the optical fiber under test; a means for coupling light into said fiber at said first end such that the light travels the entire length of said fiber and exits at said second end; a tension assembly for applying and maintaining a pre-selected, constant, yet subsequently variable, tension to said optical fiber; a plurality of pins having diverse diameters, said pins providing diverse bend diameters; a means for mounting said pins, one at a time, such that said fiber contacts a portion of the surface of said mounted pin while traversing between said supply spool and said tension assembly; a swing arm, said arm being located between said supply spool and said tension assembly and capable of smoothly swinging in an arc to subtend a pre-selected range of bend angles; a first motor, said first motor being connected to move said arm to make said arc; a first pulley rotatably attached to said swing arm, said first pulley guiding and maintaining said optical fiber thereon while said arm swings; an optical detector coupled to said second end of said fiber to detect light exiting therefrom and convert said exiting light to corresponding voltage signals as said arm swings through said pre-selected range of bend angles; and a computer, said computer being coupled simultaneously to said first motor to effect said swing arm to sweep through said pre-selected range of bend angles and to said optical detector to receive from said detector said voltage signals at each of the bend angles and calculate therefrom optical bendloss and display said bendloss for viewing; said bendloss being indicative of the bend sensitivity of said optical fiber at said pre-selected bend diameter provided by said pre-selected pin and at said pre-selected tension throughout said pre-selected range of bend angles.

2. A dynamic bendloss measuring device for measuring the bend sensitivity of a single mode optical fiber at various bend diameters as described in claim 1, wherein said means for mounting said pins is an aperture, said aperture being adjustably-sized to accommodate therein pins of diverse diameters and allow a length of said accommodated pin to protrude from said aperture, said aperture further being positioned so as to enable said protruding length of said accommodated pin, jointly with said first pulley, to guide and maintain said fiber between said accommodated pin and said first pulley as said arm swings through said pre-selected range of bend angles.

3. A dynamic bendloss measuring device as described in claim 2, wherein said pre-selected range of bend angles is 0° to 170°.

4. A dynamic bendloss measuring device as described in claim 3, wherein said tension assembly comprises a first shaft; a take-up spool rotatably mounted on said first shaft; a second motor for providing input current; and a clutch coupled between said second motor and said first shaft, said clutch producing output torque in response to said input current, said output torque causing said first shaft to rotate said take-up spool, thereby collecting said fiber thereon, until resultant tension in said optical fiber imparts to said first shaft a torque equal to said clutch output torque, whereupon said clutch slips so as to maintain a constant pre-selected tension in said optical fiber as said swing arm swings through said pre-selected range of bend angles.

5. A dynamic bendloss measuring device as described in claim 4, wherein said clutch is a magnetic particle clutch and said second motor is an AC synchronous motor.

6. A dynamic bendloss measuring device as described in claim 5, wherein said tension assembly further comprises a second pulley positioned between said first pulley and said take-up spool to guide said fiber in its traverse from said first pulley to said take-up spool.

7. A dynamic bendloss measuring device as described in claim 6, wherein said swing arm, said first pulley and said aperture are mounted on a bracket.

8. A dynamic bendloss measuring device as described in claim 7, wherein said dynamic bendloss measuring device further comprises a second shaft, said second shaft supporting said bracket thereon and providing a means for adjusting the position of said bracket vertically on said second shaft.

9. A dynamic bendloss measuring device as described in claim 8, wherein said dynamic bendloss measuring device still further comprises a third pulley, positioned between said supply spool and said first pulley, said third pulley being mounted to guide said optical fiber in its traverse from said supply spool to said first pulley while isolating said supply spool from the tension applied by said tension assembly.

10. A dynamic bendloss measuring device as described in claim 9, wherein said third pulley provides a high level of friction while said first and second pulleys provide minimal friction to said optical fiber being guided thereby.

11. A dynamic bendloss measuring device as described in claim 10, wherein said measuring device is supported by a base plate for stability.

12. A dynamic bendloss measuring device for measuring the bend sensitivity of a single mode optical fiber at various bend diameters, said optical fiber having a first end and a second end and said measuring device comprising:

a means for coupling light into said fiber at said first end such that the light travels the entire length of said fiber and exits at said second end; a tension assembly for applying and maintaining a pre-selected, constant, yet subsequently variable, tension to said optical fiber; a third pulley for guiding said optical fiber to said tension assembly; a plurality of pins, said pins having varied diameters; a means for mounting said pins, one at a time, such that said fiber contacts a portion of the surface of said mounted pin while traversing between said third pulley and said tension assembly; a swing arm having a first end and a second end, said arm being located between said third pulley and said tension assembly and capable of smoothly swinging in an arc subtending a pre-selected range of bend angles; a first motor and a second motor, said first motor being connected to move said arm to make said arc; a first pulley rotatably attached to said second end of said swing arm, said first pulley guiding said optical fiber thereon; an optical detector coupled to said second end of said fiber to detect light exiting therefrom and convert said exiting light to corresponding voltage signals as said arm swings through said pre-selected range of bend angles; and a computer, said computer being coupled simultaneously to effect said swing arm to sweep through said pre-selected range of bend angles and to said optical detector to receive from said detector said voltage signals at each of the bend angles and calculate therefrom optical bend loss and display said bend loss for viewing, said bendloss being indicative of the bend sensitivity of said optical fiber at a pre-selected bend diameter and at a pre-selected tension throughout said pre-selected range of bend angles.

13. A dynamic bendloss measuring device for measuring the bend sensitivity of a single mode optical fiber as described in claim 12, wherein said means for mounting said pins is a hole; a means for adjusting the size of said hole to accommodate therein said pins of varied diameters, said hole being positioned so as to enable said accommodated pin, jointly with said first pulley, to guide said fiber between said accommodated pin and said first pulley while said arm swings through said pre-selected range of bend angles.

14. A dynamic bendloss measuring device as described in claim 13, wherein said hole-adjusting means is an adjustable knob, said knob comprised of two identical hemispheres facing each other, each hemisphere having an indentation on the flat side thereof, said hemispheres jointly forming a hole therebetween and the size of said hole being dependent on the final, resting distance between said hemispheres.

15. A dynamic bendloss measuring device as described in claim 14, wherein said tension assembly comprises a first shaft; a take-up spool rotatably mounted on said first shaft; a second motor for providing input current; and a clutch coupled between said second motor and said first shaft, said clutch producing output torque in response to said input current, said output torque causing said first shaft to rotate said take-up spool, thereby collecting said fiber thereon, until resultant tension in said optical fiber imparts to said first shaft a torque equal to said clutch output torque, whereupon said clutch slips so as to maintain a constant pre-selected tension in said optical fiber as said swing arm swings through said pre-selected range of bend angles.

16. A dynamic bendloss measuring device as described in claim 15, wherein said means for coupling light into said first end of said optical fiber is a laser emitting a beam of 1-milliwatt in power and 1550 nanometers in wavelength.

* * * * *